United States Patent
Traynor et al.

(10) Patent No.: US 6,476,960 B1
(45) Date of Patent: Nov. 5, 2002

(54) THULIUM DOPED FIBER AMPLIFIER PUMPING SCHEME

(75) Inventors: Nicholas Traynor, Fountainebleau (FR); Bryce Samson, Horseheads, NY (US); Donnell Walton; John Minelly, both of Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/862,770

(22) Filed: May 21, 2001

(51) Int. Cl.$^7$ ............................. H01S 3/17; H01S 3/094
(52) U.S. Cl. ............................. 359/341.31; 359/341.5; 359/343; 372/6; 372/70
(58) Field of Search ..................... 359/337, 341.31, 359/341.5, 343; 372/6, 40, 70

(56) References Cited

U.S. PATENT DOCUMENTS

| | | | | |
|---|---|---|---|---|
| 5,268,910 A | * | 12/1993 | Huber | 372/6 |
| 5,341,237 A | * | 8/1994 | Tohmon et al. | 372/68 |
| 5,406,410 A | * | 4/1995 | Hanna et al. | 359/341 |
| 5,617,244 A | * | 4/1997 | Percival et al | 359/341 |
| 6,233,092 B1 | * | 5/2001 | Flood et al. | 359/345 |

OTHER PUBLICATIONS

Kasamatsu et al, IEEE Photonics Tech. Lett., vol. 13, #1, Jan. 2001; pp. 31–33.*

Wiest et al, Photonic Processing tech. & applic., vol. 3075, pp. 47–51, 1997.*

D.E. Goforth et al., Ultra–Wide Band Erbium Amplifiers Using a Multi–Component Silicate Fiber, OAA 2000, paper OTuA4.

T. Kasamatsu et al., Laser–diode pumping (1.4 and 1.56 $\mu$m) of gain–shifted thulium–doped fibre amplifier, IEE 2000, Jul. 10, 2000, Electronics Letters Online No: 20001143.

T. Kasamatsu et al., 1.5 $\mu$m–band gain–shifted thulium–doped fiber amplifier with 1.05–and 1.56–$\mu$m dual–wavelength pumping, Optics Letters, Dec. 1, 1999, pp. 1684–1686, vol. 24, No. 23.

R.M. Percival et al., Highly efficient 1.064 $\mu$m upconversion pumped 1.47 $\mu$m thulium doped fluoride fibre laser, Electronics Letters, Jun. 23, 1994, pp. 1057–1058, vol. 30, No. 13.

F. Roy et al., Novel pumping schemes for thulium doped fiber amplifier, Optical Fiber Communication Conference (OFC) of 2000 OSA Technical Digest Series, paper WA6–1.

B.N. Samson et al., *Thulium–doped silicate fiber amplifier at 1460–1520 nm*, Corning Incorporated, Corning NY, 14831.

* cited by examiner

Primary Examiner—Nelson Moskowitz
(74) Attorney, Agent, or Firm—Svetlana Short (57) ABSTRACT

An optical amplifier comprises a trivalent thulium-doped optical fiber; a first pump light emitting device optically coupled to the fiber for generating a primary pump source at a first wavelength, and a second pump light emitting device optically coupled to the fiber for generating a secondary pump source at a second wavelength. In a preferred aspect of the present invention, the amplifier also includes a third (auxiliary) pump light emitting device optically coupled to the fiber for generating a third pump source at a third wavelength. Each of the amplification signals comprise at least one pre-selected wavelength. The first amplification signal has a wavelength pre-selected to provide a reduced noise figure for the amplifier. The second amplification signal has a wavelength pre-selected to increase the optical efficiency of the amplifier. The third amplification signal can have a wavelength pre-selected to populate the $^3F_4$ energy level of the fiber, and to minimize depletion of the $^3H_6$ ground state.

38 Claims, 8 Drawing Sheets

THULIUM DOPED FIBER AMPLIFIER PUMPING SCHEME

BACKGROUND OF THE INVENTION

1. Field of the Invention

The invention relates generally to optical amplifiers and in particular to a Tm-doped fiber amplifier pumping scheme.

2. Description of the Related Art

Figure 1:
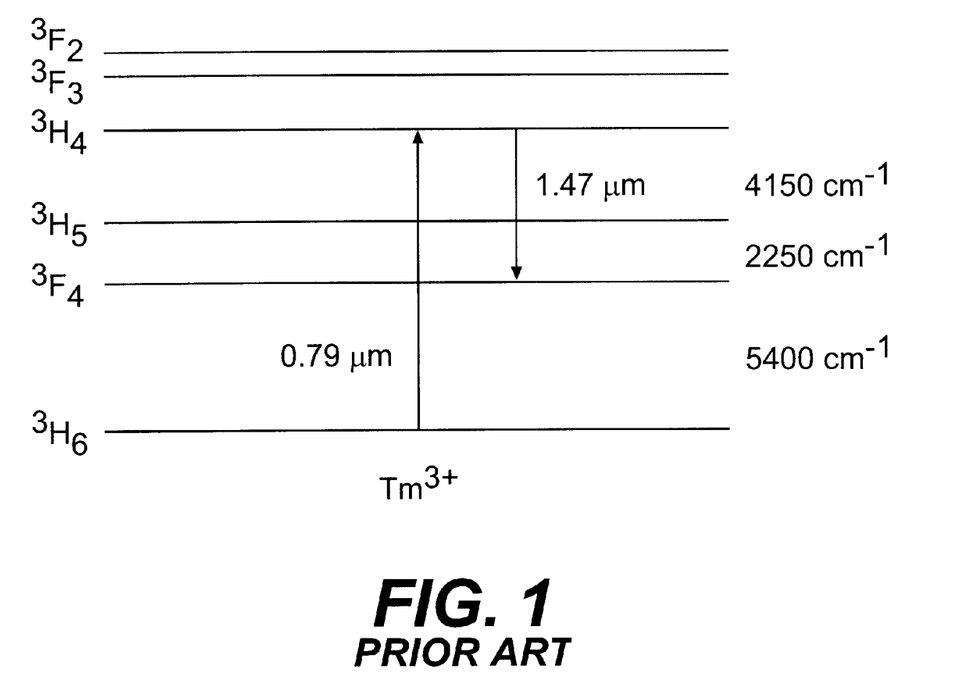
FIG. 1 is an energy level diagram for $Tm^{3+}$.

In optical telecommunications networks, high bandwidth is desired for applications such as the Internet, video on demand, and videophone. In many optical communications systems, optical signals having wavelengths in the range 1530–1560 nanometers (nm) are utilized. This wavelength range corresponds to the "C-band" in telecommunications. This wavelength range also corresponds to a minimum attenuation region for silica and silica-based fibers. Optical amplifiers are utilized to amplify the optical signals in those wavelength regions. Conventional optical fiber transmission systems typically exploit erbium doped fiber (EDF) for periodic amplification of signals attenuated by their passage through the optical fiber. In various configurations these erbium fibers can provide amplification in a wavelength range from 1530 to 1620 nm. However, the available low loss region of silica fiber for transmission extends beyond this wavelength range. One of the candidates for extending the amplification bandwidth to the S-Band wavelength region (1450–1530 nm) is the thulium doped fiber amplifier (TDFA). Within the 1450 nm–1530 nm wavelength band, trivalent thulium ($Tm^{3+}$) has an emission band centered at about 1470 nm. As shown in the $Tm^{3+}$ energy diagram of FIG. 1, the $^3H_4$–$^3F_4$ transition in $Tm^{3+}$ corresponds to an emission at about 1470 nm.

To date a number of different pumping schemes for $Tm^{3+}$ doped amplifiers have been demonstrated, including direct 800 nm pumping, 1060 nm up-conversion pumping, dual wavelength 1060 nm+1560 nm pumping and more recently a dual wavelength pumping scheme involving 1405 nm+1560 nm lasers. This last pump scheme has become a preferred pump scheme, primarily because of the intrinsically high power conversion efficiency that can obtained and the possibility of direct diode pumping of the fiber amplifier.

However it is not clear that a suitable commercial amplifier can be made from this pump scheme, in particular because of the intrinsically high noise figure that accompanies in-band (or resonant) pump schemes, where the pump and signal wavelengths are very close together.

SUMMARY OF THE INVENTION

The present invention is directed to overcoming or at least reducing the aforementioned noise figure problems, namely achieving a low noise figure without sacrificing the high power conversion efficiency that can be obtained with this pump scheme.

In view of the foregoing, according to one embodiment of the present invention, an optical amplifier comprises a trivalent thulium-doped optical fiber; a first pump light emitting device optically coupled to the fiber and acting as the primary pump source at a first wavelength, and a second pump light emitting device optically coupled to the fiber and acting as a secondary pump source at a second wavelength. In a preferred aspect of the present invention, the amplifier also includes a third (also referred to herein as an auxiliary) pump light emitting device optically coupled to the fiber and acting as a third pump source, specifically at a third wavelength. Each of the first and second pump sources comprise at least one pre-selected wavelength to pump an excited state of the fiber. The first pump source has a wavelength pre-selected to provide a reduced noise figure for the amplifier. The second pump source has a wavelength pre-selected to increase the optical efficiency of the amplifier. The third (auxiliary) pump source can have a wavelength pre-selected to populate the $^3F_4$ energy level of the fiber, without substantially increasing amplified spontaneous emission of the $^3H_4$–$^3H_6$ transition.

According to another embodiment of the present invention, a method of amplifying an optical data signal comprises providing a thulium-doped optical fiber for transmitting an optical data signal, generating a first amplification pump wavelength corresponding to a first emission cross section of the $^3H_4$ to $^3F_4$ transition of the fiber, and generating a second amplification pump wavelength corresponding to a second emission cross section of the $^3H_4$ to $^3F_4$ transition; introducing said first amplification pump wavelength and said second amplification pump wavelength into said fiber, wherein the first wavelength corresponds to a lower emission cross section and lower excited state absorption cross section of the fiber than the second wavelength.

Other advantages and novel features of the present invention will become apparent from the following detailed description of the invention when considered in conjunction with the accompanying drawings.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Reference will now be made in detail to present embodiments of the invention. Wherever possible, the same reference numbers will be used throughout the drawings to refer to the same or like parts.

The present invention relates to an optical network. More specifically, the present invention provides an amplification pumping scheme for amplifying an optical data signal propagating in an optical network.

As the inventors have discovered, a pumping scheme for a $Tm^{3+}$-doped fiber amplifier utilizing multiple pump signal wavelengths can provide a minimized noise figure while at the same time maintain a very high power conversion efficiency, with at least 10–30 dB gain of an optical data signal within the S-band (1460–1530 nm) wavelength region. In particular, a preferred embodiment of the present invention provides dual pumping of a $Tm^{3+}$-doped fiber amplifier, with a first coil being pumped at a wavelength less than 1400 nm (for noise figures less than about 4 dB) and a second coil pumped at wavelengths longer than the first pump wavelength to improve power conversion efficiency.

Figure 3:
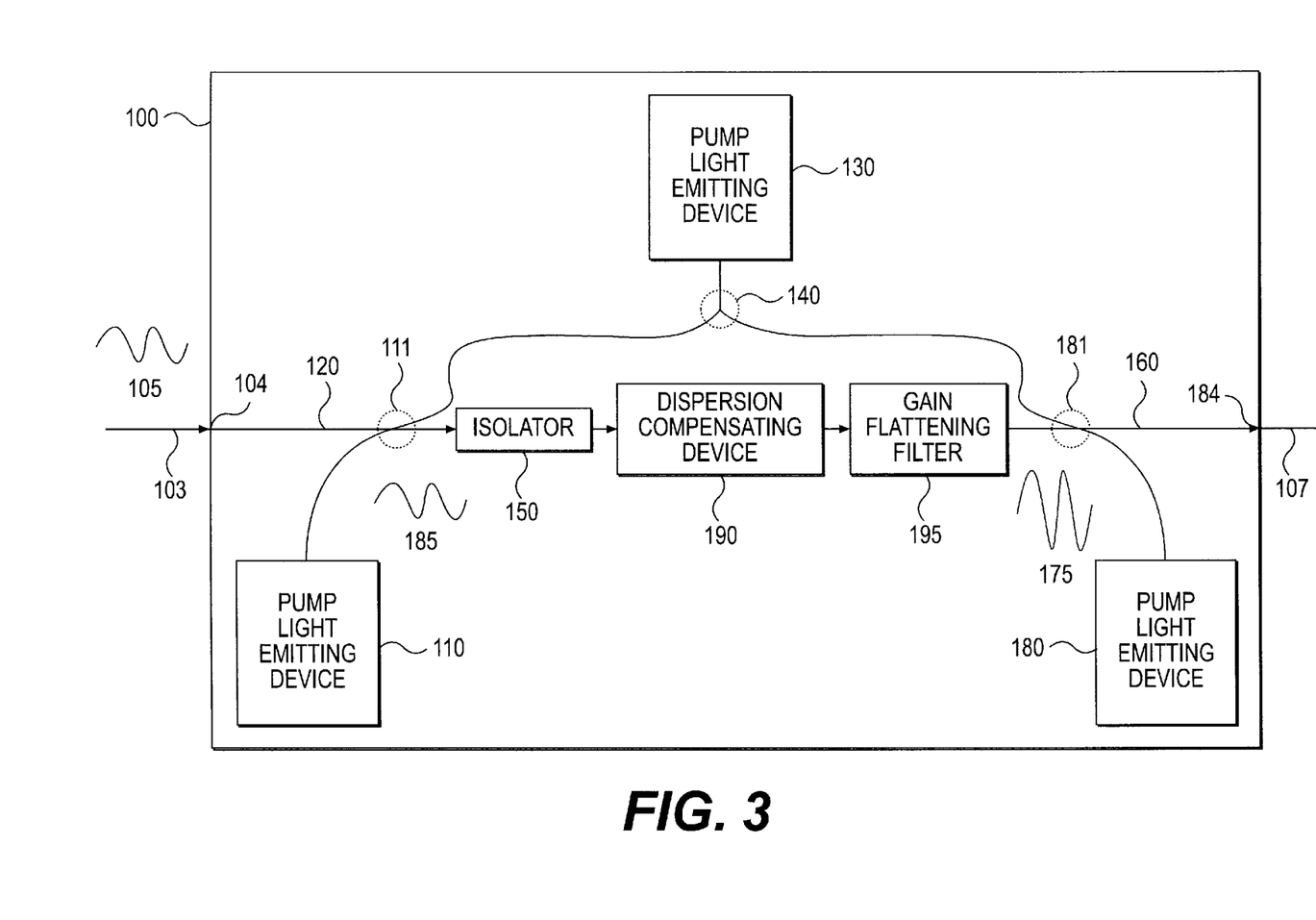
FIG. 3 is a schematic diagram of amplification pumping scheme according to a first embodiment the present invention.

In a first embodiment as shown in FIG. 3, a input optical data signal 105 is shown being carried on fiber 103. Preferably, optical data signal 105 is a multiplexed optical data signal comprising 1–N wavelengths each separated by a predetermined wavelength spacing (eg., 0.4 nm, 1.0 nm, etc.) based on network specifications. Optical data signal 105 is received at optical amplifier 100 at input port 104. Optical amplifier 100 can be included as part of a repeater stage in an optical network, as will be apparent to one of ordinary skill in the art given the present description.

Input port 104 is optically coupled to an optical fiber 120. According to a preferred embodiment, optical fiber 120 comprises a $Tm^{3+}$-doped optical fiber. A first pump light emitting device 110 for generating a first amplification pump wavelength is shown optically coupled to fiber 120. A second pump light emitting device 180 for generating a second amplification pump wavelength is shown optically coupled to fiber 160. According to a preferred embodiment, both fibers 120 and 160 are $Tm^{3+}$-doped optical fibers. In a preferred embodiment, both fibers 120 and 160 have the same composition. Alternatively, fibers 120 and 160 can have different compositions.

According to a preferred embodiment, pump light emitting devices 110 and 180 comprise cascaded Raman laser devices, each Stokes-shifted to a predetermined wavelength according to the scheme described below. For example, pump light emitting devices 110 and 180 can each comprise a cascaded Raman resonator pumped by a double clad ytterbium fiber laser. Alternatively, pump light emitting devices 110 and 180 can comprise diode laser sources emitting radiation in the wavelength ranges of interest that are coupled to single mode optical fibers. The pump light emitting devices 110 and 180 are introduced into fibers 120 and 160 respectively via conventional optical couplers 111 and 181.

Preferably, optical amplifier 100 further includes a third (auxiliary) pump light emitting device 130 acting as a third wavelength pump source and is shown optically coupled to a power splitter 140. Third pump light emitting device 130 can comprise a conventional semiconductor diode laser. Power splitter 140, which comprises a conventional power splitter, is shown optically coupled to optical fibers 120 and 160. An example optical signal before amplification 185 and an optical signal after amplification 175 are shown for example only, and may not resemble actual optical signals.

An amplifier as described in this first embodiment represents a two-stage amplification technique. Pump light emitting device 110 provides a first stage of amplification along optical fiber 120 ("first stage amplification"), where optical fiber 120 can also be referred to as a first fiber coil. Pump light emitting device 180 provides a second stage of amplification along optical fiber 160 ("second stage amplification"), where optical fiber 160 can also be referred to as a second fiber coil. The first and second amplification stages can be part of the same amplifier coil in a single or multi-amplifier system.

Figure 2:
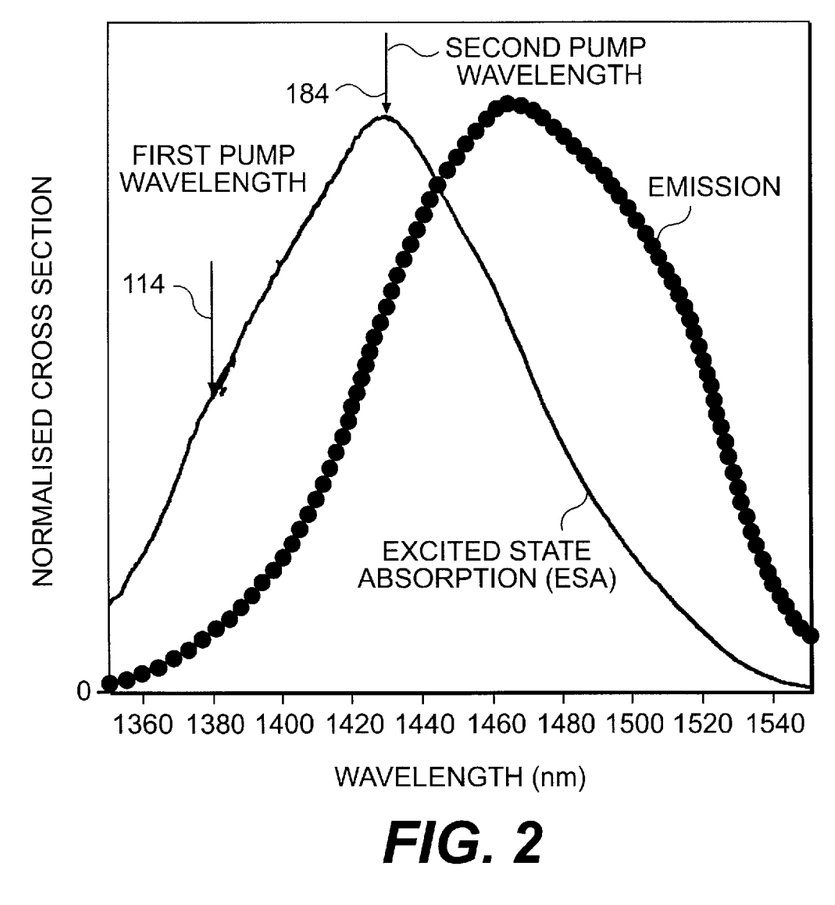
FIG. 2 shows an example excited state absorption cross-section corresponding to the $^3F_4$ to $^3H_4$ transition of $Tm^{3+}$ and an emission cross-section corresponding to the $^3H_4$ to $^3F_4$ transition for $Tm^{3+}$.

Referring back to FIG. 1, within the 1460 nm to 1530 nm wavelength band, $Tm^{3+}$ has an emission band centered at about 1470 nm, corresponding to the $^3H_4$–$^3F_4$ transition in $Tm^{3+}$. An emission cross section corresponding to this transition is shown in FIG. 2 for an example $Tm^{3+}$ doped fiber. This example fiber includes about 20 (wt.) % $Sb_2O_3$ and about 80 (wt.) % $SiO_2$. FIG. 2 also shows an excited state absorption cross section for the corresponding $^3F_4$–$^3H_4$ transition.

To improve the performance of the Thulium doped fiber amplifier in the 1460–1530 nm band, a dual wavelength excitation scheme may be provided to both reduce the noise figure (NF) of optical amplifier 100 and still provide sufficient optical efficiency for amplification in the S- band.

The noise figure (NF) of the entire amplifier 100 can be estimated by the equation:

$$Nf_{amplifier} = Nf_{first\ stage} + (Nf_{second\ stage} - 1)/Gain_{first\ stage}$$

The first wavelength of a first amplification signal generated by the first pump light emitting device 110 is preselected for a low NF, to optimize the noise figure of the entire amplifier. A low NF can be achieved by selecting a wavelength resulting in a high excited state absorption-to-emission ratio, as shown in the excitation diagram of FIG. 2.

Figure 6:
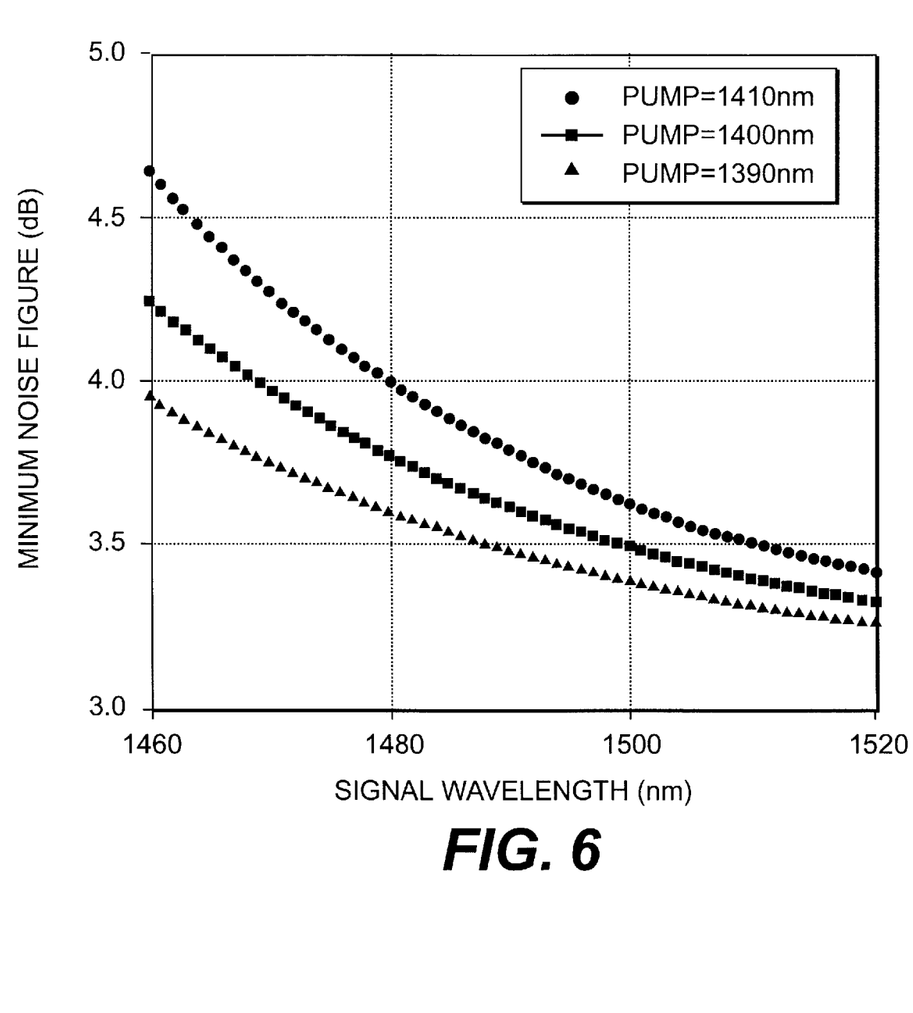
FIG. 6 is a plot showing the dependence of the minimum noise figure (dB) on the signal wavelength for an example $Tm^{3+}$ doped amplifier when pumped at wavelengths in the 1390–1410 nm range.
Figure 7:
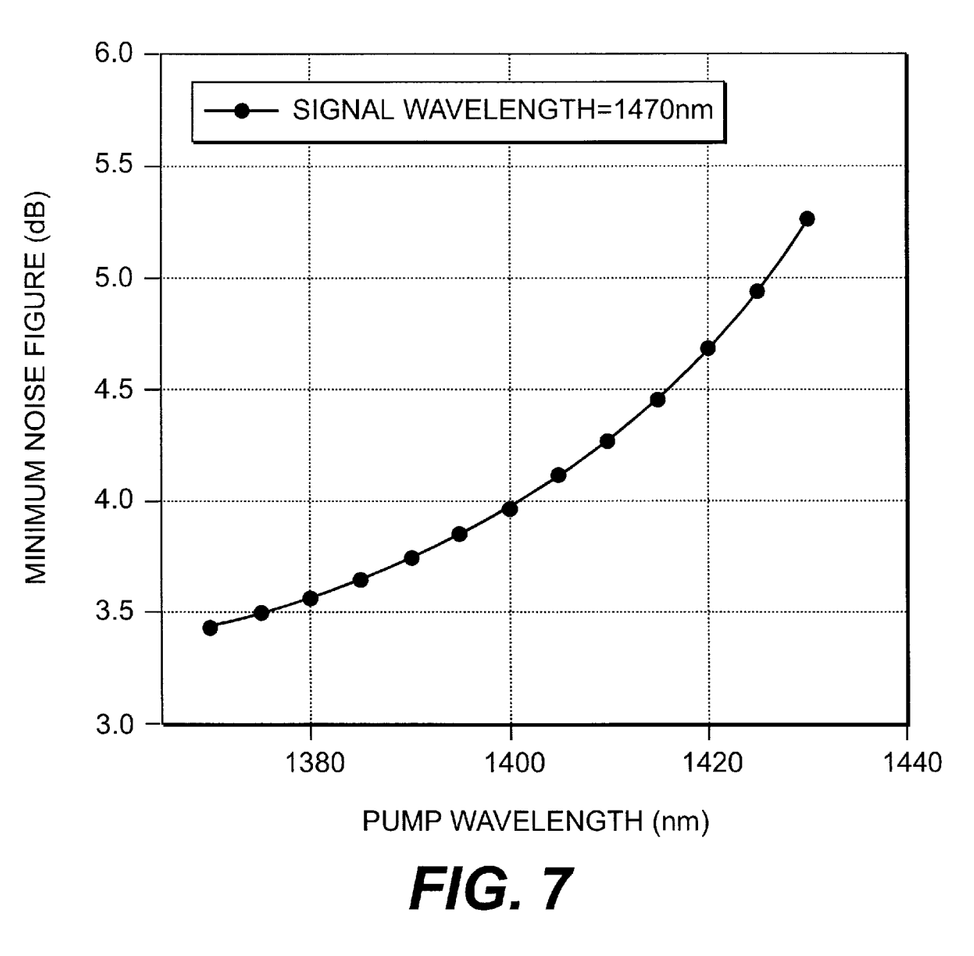
FIG. 7 is a plot showing an increase in noise figure (fixed signal wavelength of 1470 nm) for an example $Tm^{3+}$ doped amplifier when the pump wavelength is increased from 1370 to 1430 nm.

For example, FIG. 6 shows the dependence of the minimum noise figure (dB) on the signal wavelength for a $Tm^{3+}$ doped amplifier when pumped at wavelengths in the 1390–1410 nm range. FIG. 6 shows the noise figure is clearly increasing rapidly as the signal wavelength decreases. Similarly, the increase in noise figure (fixed signal wavelength of 1470 nm) when the pump wavelength is increased from 1370 to 1430 nm is shown in FIG. 7.

Preferably, the energy difference between pump wavelength and the shortest signal wavelength is selected to be as large as possible. In the above example, a pump wavelength about 1400 nm or less can be chosen to maintain a noise figure of less than about 4.0 dB across the 1470–1520 nm band. Thus, this pump wavelength would be preferred for the first coil of a two-coil amplifier.

However it is recognized that in some applications, a higher or lower noise figure can be acceptable/required. Further, systems utilizing signal wavelengths shorter than 1470 nm may also be utilized. With respect to these example situations, it is preferable to utilize the relationship between noise figure (NF) and pump/signal wavelength separation ($\Delta\lambda$), where NF~4 dB for $\Delta\lambda$=70 nm and 4.5 dB for $\Delta\lambda$=55 nm.

Figure 8:
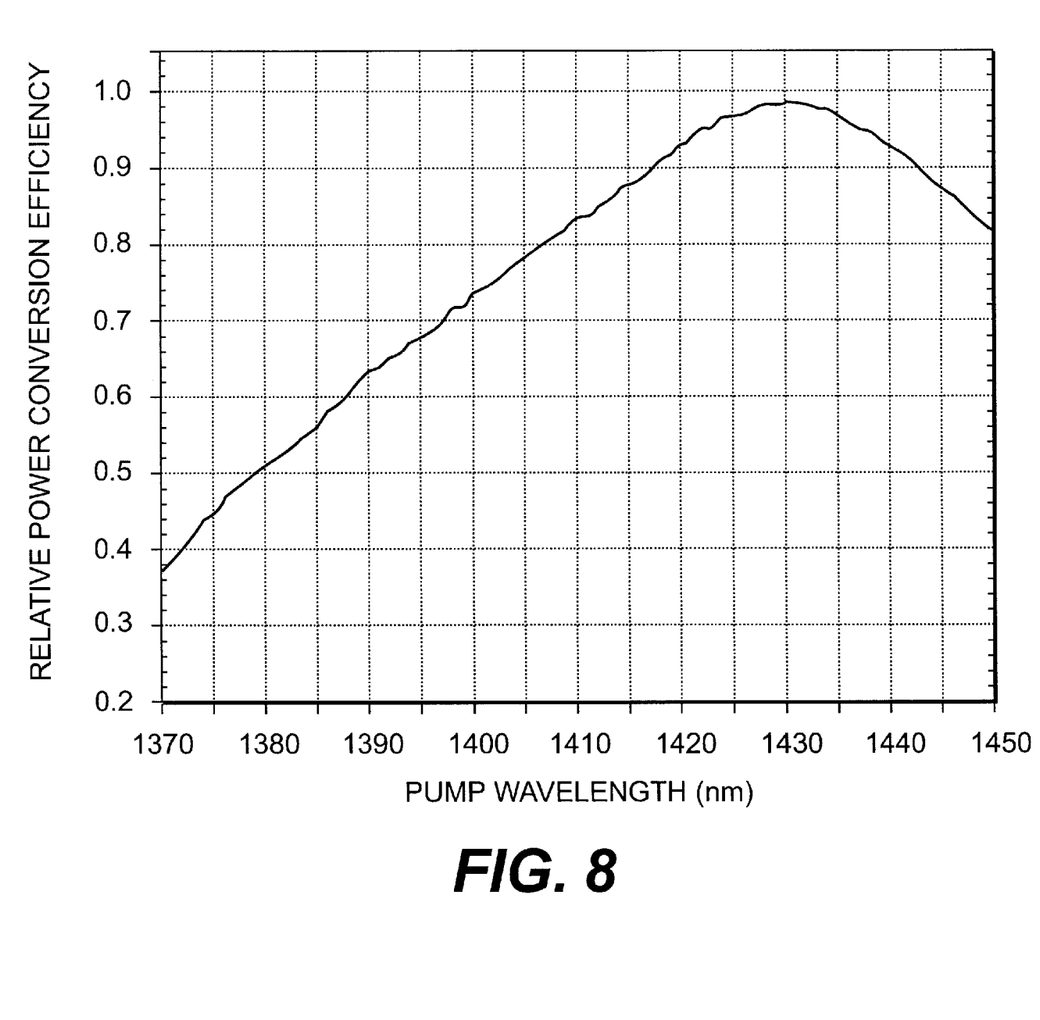
FIG. 8 is a plot showing the relative power conversion efficiency as a function of pump wavelength for an example $Tm^{3+}$ doped amplifier.

A second consideration is the impact of pump wavelength on the power conversion efficiency of the amplifier. This relationship is illustrated in FIG. 8, where the relative power conversion efficiency reaches a maximum at the peak of the ESA curve, in this example about 1420 nm–1430 nm. Thus, pumping at 1400 nm (the preferred wavelength for the noise figure optimization described above) would result in less power conversion efficiency, and in this example the second coil of the amplifier (power amplifier stage) would be preferably pumped at a wavelength of about 1420 nm, resulting in a relative increase in power conversion of around 20% compared with a 1400 nm pump wavelength.

Thus, according to a preferred aspect of this embodiment, a first wavelength of about 1300 nm to about 1399 nm can be used to generate a sufficiently high-excited state absorption in the Tm$^{3+}$-doped fiber. A preferred first wavelength can be about 1370 nm to about 1380 nm.

In addition, according to a preferred aspect of this embodiment, a pump wavelength can be selected from a wavelength range corresponding a noise figure of less than about −4.5 dB, where the wavelength separation (Δλ) between primary pump wavelength and the shortest wavelength signal in the S-band system under consideration is greater than or equal to about 55 nm. More preferably, a pump wavelength can be selected from a wavelength range corresponding a noise figure of less than about 4.0 dB, where Δλ≧70 nm.

For example, referring to FIG. 2, a pump signal 114 at about 1370 nm to 1380 nm will be absorbed by a Tm$^{3+}$-doped fiber to create a greater population in the $^3H_4$ level. However, the emission cross section for this pump wavelength is significantly lower than when pumping at the peak (1400 nm–1420 nm) of the excited state absorption cross section. Thus, when the 1370 nm to 1380 nm pump is introduced in the first stage (or near the input port of the amplifier 100, such as shown in FIG. 3), the relative $^3H_4$ to $^3F_4$ inversion will be higher than that using a longer wavelength pump, thus reducing the noise figure. Thus in an alternative aspect of this embodiment, the first amplification pump wavelength can correspond to an excited state absorption cross section value that is at least two times greater than an emission cross-section value at the first pump wavelength.

In an alternative embodiment, the first pump light emitting device 100 can be used to generate a primary pump source with a first wavelength of about 1000 nm to about 1099 nm, with a preferred wavelength of 1060 nm. In this alternative embodiment, the first pump source promotes electrons into the $^3F_2$ energy level of Tm$^{3+}$, which then relax non-radiatively into the $^3H_4$ upper level of the amplifying transition. This pump wavelength provides a high absorption/emission ratio and therefore a low NF for the first stage of the amplifier. For example, this alternative pump signal wavelength can be generated using a solid state Nd laser (e.g., 1060 nm for a Nd:YAG source). An Nd-doped fiber laser may also be used to generate an amplification signal at about 1000–1100 nm. Other laser sources (solid state, laser diode, and the like) can also be utilized at this wavelength region as will be apparent to one of ordinary skill in the art given the present description.

Further, as discussed previously, the positioning of first pump light emitting device 110 within amplifier 100 (in terms of where the first pump signal is introduced in fiber 120) may be configured to optimize the NF of the first stage of amplification. In the embodiment shown in FIG. 3, a forward pumping scheme (i.e., where the pump signal propagates in the same direction as the optical data signal 175) can be used to introduce the first pump signal into fiber 120 near input port 104 of optical fiber 120.

According to the embodiment shown in FIG. 3, the second pump wavelength of the amplification scheme is generated by the second pump light emitting device 180. The second wavelength is pre-selected for a higher (as compared to the first pump wavelength) or peak excited state absorption wavelength to optimize the optical to optical efficiency of amplifier 100. As shown in FIG. 3, preferably, the second pump signal can be introduced into the second stage fiber (via optical coupler 181) near output port 184 of amplifier 100. As the amplifier's NF is less dependent on the second stage of amplification than the first stage of amplification, preferably a peak excited state absorption wavelength is utilized. Thus, a second pump wavelength at about 1400 nm to about 1499 nm can be used. A preferred wavelength of about 1400 nm to about 1420 nm can be selected, as this wavelength corresponds to the absorption peak for the example fiber of FIG. 2.

Further, the positioning of second pump light emitting device 180 can be configured to optimize the efficiency of the second stage of amplification. In a preferred embodiment, the second pump signal is introduced in second stage fiber 160 near the output port 184 of optical amplifier 160. In this configuration, the second pump signal counter propagates with respect to the propagation direction of the optical data signal. This pumping scheme thus provides sufficient amplification without a deleterious increase in the amount of noise amplified. The NF and pump/signal wavelength relationship may be estimated by the equation:

$$NF=2/(1-\exp((E_s-E_p)/(KT)))$$

where $E_s$ and $E_p$ are the signal and pump photon energies respectively, K is the Boltzmann factor and T is the temperature. Thus, for a combined first and second stage Tm$^{3+}$-doped fiber length of about 1 to about 10 meters, a gain of about 10 to about 30 dB can be achieved.

Figure 4:
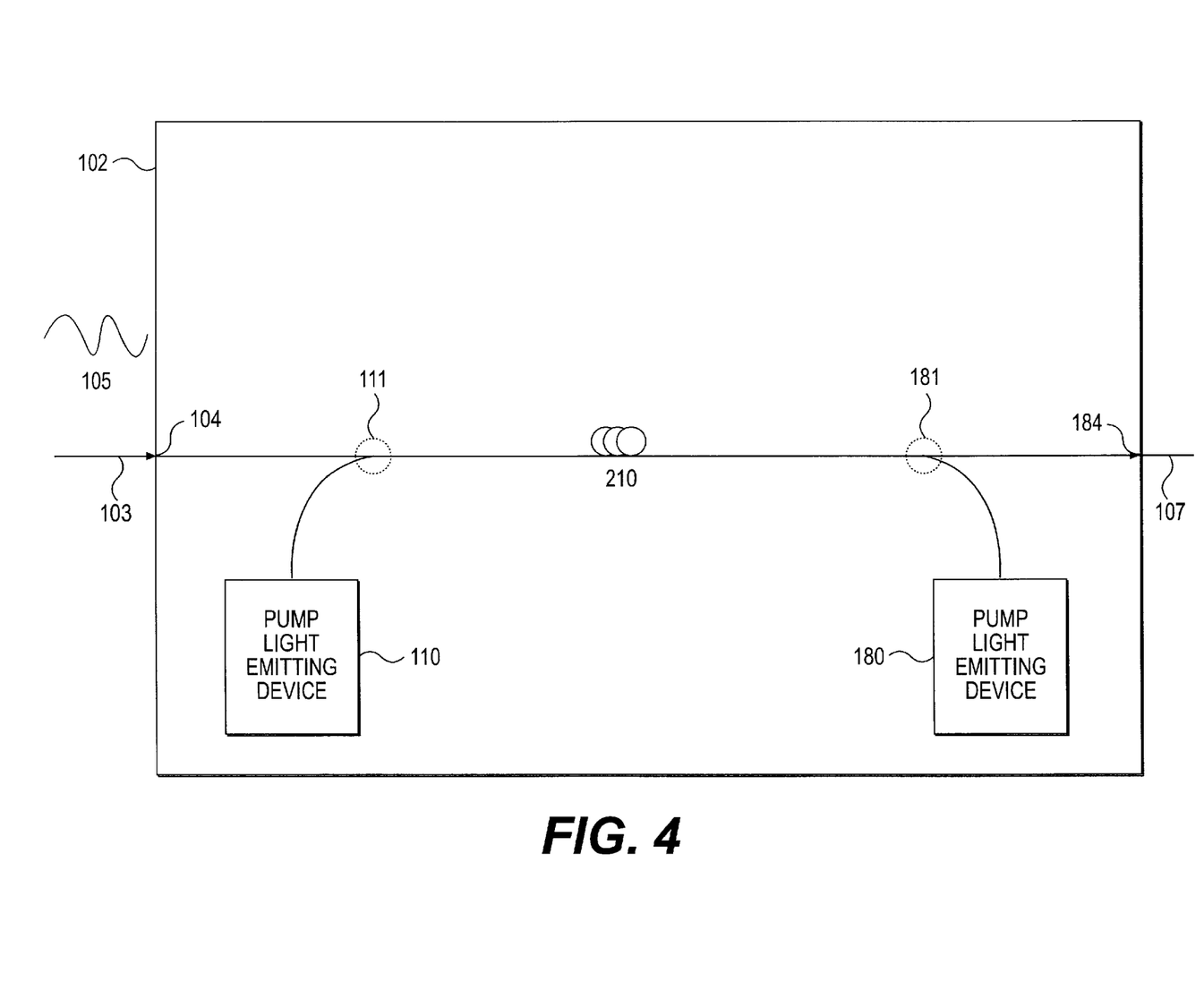
FIG. 4 is a schematic diagram of an amplification pumping scheme according to a second embodiment the present invention.

Optionally, as shown in the preferred embodiment of FIG. 3, amplifier 100 can further include a third pump light emitting device 130. An amplifier 102 with only first and second pump light emitting devices 110 and 180 is shown in FIG. 4.

The wavelength of an pump radiation generated by the third pump light emitting device 130 is preferably preselected to further populate the $^3F_4$ energy level of the Tm$^{3+}$-doped fiber to increase the efficiency of the excited state absorption into the $^3H_4$ level. The wavelength and/or power of the third pump may also be chosen to minimize substantial depletion of the $^3H_6$ ground state of the Tm$^{3+}$-doped fiber, while still promoting emission at the desired S-band wavelengths. According to a preferred embodiment, a third wavelength of about 1550 nm to about 1620 nm, preferably about 1560 nm to about 1600 nm, and more preferably about 1555 nm to about 1565 nm, and most preferably about 1560 nm, can be used. As the energy required to populate the $^3F_4$ energy level (from the ground state) of the Tm$^{3+}$-doped fiber is relatively low (under about 100 mW), a conventional laser diode may be utilized to generate a sufficient amount of the third amplification pump signal. The 1550 nm to about 1620 nm band is more preferable than the 1700 nm–1750 nm band because pumping at longer wavelengths increases the depletion of the Tm$^{3+}$ ground state, which can increase the likelihood of amplified spontaneous emission of the $^3H_4$–$^3H_6$ transition.

As shown in FIG. 3, a conventional power splitter 140 can be used to provide 1550 nm to 1620 nm pumping in both amplification stages. In the configuration shown in FIG. 3, the first stage is reverse pumped and the second stage is forward pumped. Alternatively, both stages can be forward pumped or reversed pumped, or any combination thereof, while still providing an adequate increase in the $^3F_4$ energy level population. The split third pump signals can be introduced into fibers 120 and 160 via conventional couplers (not shown).

For a practical amplifier device, an optical isolator 150 can be included in amplifier 100, preferably located between the first and second amplification stages. Conventional optical isolators are known. Isolator 150 can allow the input optical data signal to propagate in a substantially forward direction (left to right as shown in FIG. 3), while preventing counter-propagating signals to propagate from the second stage to the first stage. Isolator 150 can thus substantially reduce backscatter and other noise propagating in a direction counter to the direction of the input optical data signal.

Optionally, amplifier 100 can further include a dispersion compensating device 190, which can be used to compensate for dispersion effects within an optical network (see FIG. 5), either short haul, long haul, or ultra long haul systems. The location of dispersion compensating device 190 is preferably between the first and second stages, but can also be located proximate to input port 104 or output port 184. A conventional dispersion compensating device can be used for device 190, as will be apparent to one of ordinary skill in the art given the present description. Conventionally, in a fiber network, an optical amplifier is placed after a long span of optical fiber, where the optical data signal enters the optical amplifier after already undergoing some dispersion in the long span of optical fiber. Dispersion compensating device 190 can impose a 5–20 dB loss, hence it is preferable to compensate for dispersion in a dispersion compensating device 190 positioned within an amplifier, where the signal loss due to the dispersion compensating device 190 can be mitigated by the amplifier gain.

Further, optionally, amplifier 100 can also include a gain flattening filter 195 to substantially flatten the gain of the optical amplifier across a pre-determined band of input signal wavelengths. Thus, gain flattening filter 195 can be provided to substantially equalize the amplification of multiple signal wavelengths. The location of gain flattening filter 195 is preferably between the first and second stages, but can also be located proximate to input port 104 or output port 184.

It will be readily apparent to one skilled in the art after reading this disclosure, that isolator 150, dispersion compensating device 190, and gain flattening filter 195 are optional and are not limiting on the scope of this invention. Further, the length of the thulium-doped fiber 120 may vary by application, with typical lengths in the range of 1 m to 20 m.

The composition of fiber 120 (and fiber 160) may also vary per application. A preferred optical fiber 120 comprises $Tm^{3+}$-doped Sb silicate ($Sb_2O_3$)-based fiber. For example, an exemplary $Tm^{3+}$-doped fiber comprises about 20 (wt.) % $Sb_2O_3$ and about 80 (wt.) % $SiO_2$. Alternatively, fiber 120 (and/or fiber 160) may comprise a $Tm^{3+}$-doped $GeO_2$ fiber. Alternative fiber compositions include Sb/Germanate; tellurite; aluminate and fluoride compositions. The optical fiber 160 may comprise thulium-doped fiber, or other configurations of optical fiber such as erbium doped fiber (EDF), single mode fiber (SMF), multi mode fiber (MMF), or slope compensating fiber (SCF), for example.

The aforementioned configuration can achieve a substantially high amount of signal amplification at a high efficiency with relatively low noise amplification. For example, FIGS. 6 and 7 show experimental data that can be used to optimize the noise figure of the amplifier, as would be apparent to one of ordinary skill in the art given the present description. Thus, a pump wavelength of the first pump light emitting device may be selected to optimize the noise figure of a first stage of the amplifier. Similarly, FIG. 8 shows experimental data that can be used to optimize the relative power conversion efficiency of the amplifier. Thus, a pump wavelength of the second pump light emitting device may be selected to optimize the efficiency of the second stage of the amplifier.

The use of Thulium doped fiber rather than EDFA fiber provides amplification in the S-band region, a region in which EDFA fiber has not been shown to provide substantial optical signal amplification.

In a second embodiment, an optical amplifier 102 can be provided as shown in FIG. 4. A first pump light emitting device 110 can generate a first amplification pump wavelength in accordance with that described previously with respect to FIG. 3. A second pump light emitting device 180 can generate a second amplification pump wavelength in accordance with that described previously with respect to FIG. 3. Optical fiber 210 is a $Tm^{3+}$-doped fiber, the same as or similar to that described previously.

Amplifier 102, as described in this second embodiment, also comprises a two stage amplification technique. Pump light emitting device 200 provides a first stage of amplification along optical fiber 210 ("first stage amplification"). Pump light emitting device 180 provides a second stage of amplification along optical fiber 210 ("second stage amplification"). Preferably, an optical isolator, such as isolator 150, is also included to reduce backscatter and other noise propagating in a direction counter to the direction of the input optical data signal.

The aforementioned NF equation as described according to a first embodiment of the present invention also applies to this second embodiment of the present invention. The wavelength of a first pump radiation generated by a first pump light emitting device 200 is selected to promote a low NF in the first amplification stage. Preferably, the first pump light emitting device 110 outputs a pump radiation at a wavelength of about 1300 nm to about 1499 nm, more preferably at about 1370 nm to about 1380 nm, resulting in a low NF. The wavelength of the second optical pump, generated by the second pump light emitting device 220, can be selected to promote high efficiency in the second amplification stage. For example, a second pump wavelength at about 1400 nm to about 1499 nm, preferably at about 1400 nm to about 1420 nm, provides higher excited state absorption by the $Tm^{3+}$-doped fiber.

According to this second embodiment, a third pump light emitting device to populate the $^3F_4$ energy level of the fiber is not included. The third pump light emitting device may be omitted, at least partially because there is still a small excited state absorption at around 1400 nm in $Tm^{3+}$. The aforementioned advantages of the first embodiment also apply to the second embodiment. Further, the omission of a third pump light emitting device has the inherent advantage of requiring fewer pump light emitting devices, and is thus a less expensive optical amplifier to manufacture.

Figure 5:
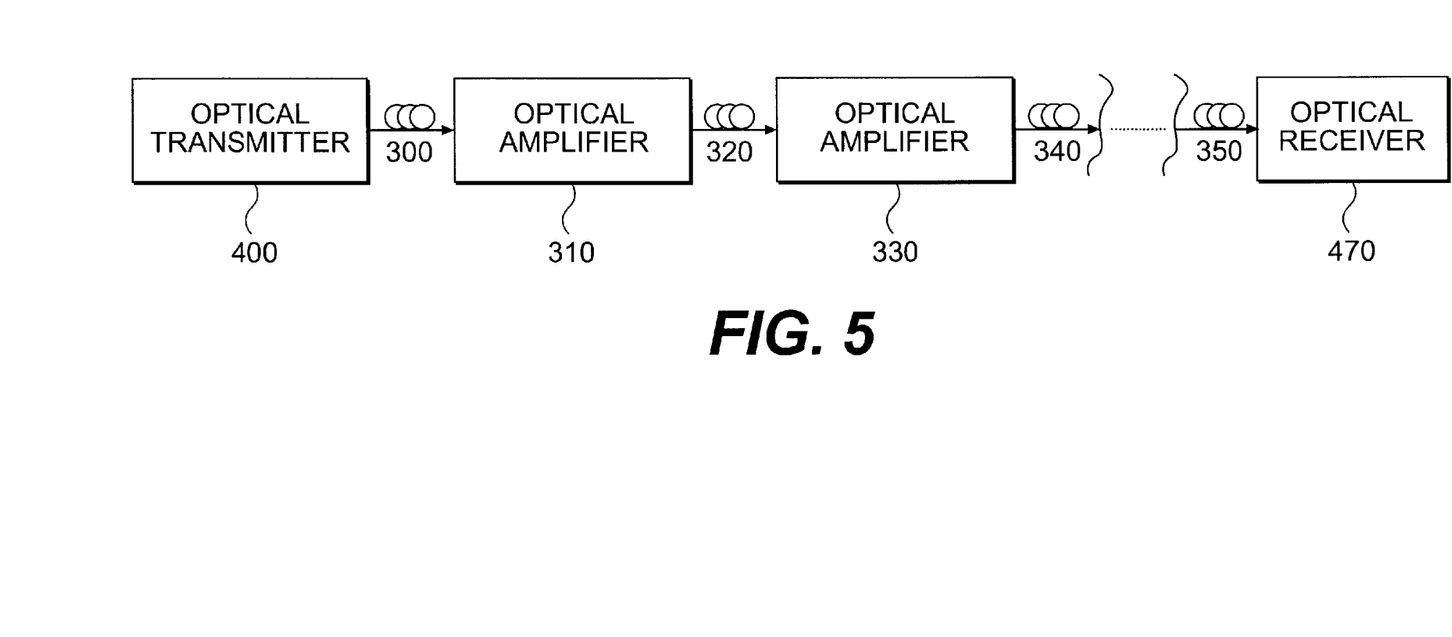
FIG. 5 is schematic diagram of an optical network system according to another embodiment of the present invention.

In a third embodiment as shown in FIG. 5, an optical network is shown in block diagram. Optical transmitter 400 for generating an input optical signal is shown optically coupled to optical fiber 300. Transmitter 400 can be a conventional transmitter for emitting a multiplexed optical data signal in the S-, C-, or L-bands. Optical receiver 470 for receiving the transmitted multiplexed optical data signal is shown optically coupled to optical fiber 350. Optical amplifiers 310 and 330, shown optically coupled to optical fibers 300, 320 and 340, can comprise one or more amplifiers such as amplifiers 100 and/or amplifier 102. In this third embodiment, any number of optical amplifiers as described by the present invention may be incorporated into an optical network. Optical fibers 300, 320, 340, and 350 may comprise long or short spans of optical fiber, such as single mode fiber (SMF), multi-mode fiber (MMF), and/or slope compensating fiber (SCF) for example. The number of optical amplifiers and optical fibers may vary by application.

Thus, an optical amplifier has been described according to the present invention that provides efficient amplification, population inversion control to allow gain shaping, and is compatible with all-diode pumping of the amplifier. Further, the amplifier configuration can minimize the noise figure while at the same time preserve the efficiency of the amplifier. Many modifications and variations may be made to the techniques and structures described and illustrated herein without departing from the scope of the invention. Accordingly, it should be understood that the methods and apparatus described herein are illustrative only and are not limiting upon the scope of the invention.

What is claimed is:

1. An optical amplifier comprising:

a trivalent thulium-doped optical fiber;

a first pump light emitting device optically coupled to said fiber for generating a first amplification pump wavelength;

a second pump light emitting device optically coupled to said fiber for generating a second amplification pump wavelength; and a third pump light emitting device optically coupled to said fiber for generating a third amplification pump wavelength, wherein each of said first and second amplification pump wavelengths comprise at least one pre-selected wavelength to pump an excited state of the fiber, wherein the first amplification pump wavelength is pre-selected to optimize the noise figure of said amplifier such that the first amplification pump wavelength is shorter than the second amplification pump wavelength and corresponds to a lower noise figure than that achieved with the second amplification pump wavelength alone, wherein said second amplification pump wavelength is pre-selected to optimize the optical efficiency of said amplifier such that the second amplification pump wavelength is longer than the first amplification pump wavelength and corresponds to a higher power conversion efficiency than that achieved with the first amplification pump wavelength alone.

2. The amplifier of claim 1, wherein the third amplification pump wavelength populates the $^3F_4$ energy level of the fiber without substantially increasing amplified spontaneous emission of the $^3H_4$–$^3H_6$ transition.

3. The amplifier of claim 1, wherein the third amplification pump wavelength is about 1550 nm to about 1620 nm.

4. The amplifier of claim 1, wherein the first amplification pump wavelength is about 1300 nm to about 1399 nm.

5. The amplifier of claim 4, wherein the first amplification pump wavelength is about 1370 nm to about 1380 nm.

6. The amplifier of claim 1, wherein the first amplification pump wavelength is about 1000 nm to about 1099 nm.

7. The amplifier of claim 6, wherein the first amplification pump wavelength is about 1060 nm.

8. The amplifier of claim 1, wherein the first light emitting device is a solid state Nd laser.

9. The amplifier of claim 1, wherein the first light emitting device is a Nd-doped fiber laser.

10. The amplifier of claim 1, wherein the second amplification pump wavelength is about 1400 nm to about 1499 nm.

11. The amplifier of claim 10, wherein the second amplification pump wavelength is about 1400 nm to about 1420 nm.

12. The amplifier of claim 1, wherein the optical fiber is an Sb silicate fiber.

13. The amplifier of claim 1, wherein the optical fiber further comprises $GeO_2$.

14. The amplifier of claim 1, further comprising:

a power splitter optically coupled to the optical fiber and the third pump light emitting device.

15. The amplifier of claim 1, wherein the fiber comprises a first stage fiber and a second stage fiber, and the amplifier further comprises:

a dispersion compensation device optically coupled to the optical fiber between the first and second stage fibers and between the first pump light emitting device and the second pump light emitting device.

16. The amplifier of claim 1, further comprising:

an optical isolator optically coupled to the optical fiber between the first pump light emitting device and the second pump light emitting device.

17. The amplifier of claim 1, further comprising:

a gain flattening filter optically coupled to the optical fiber between the first pump light emitting device and the second pump light emitting device.

18. The amplifier of claim 1, wherein the fiber has an input portion to receive a multiplexed optical data signal, wherein the first pump light emitting device emits a pump wavelength of about 1370 nm to 1380 nm introduced into the fiber in proximately to the input portion, and the first amplification pump wavelength co-propagates with respect to the propagation direction of the multiplexed optical data signal along the fiber.

19. The amplifier of claim 1, wherein the fiber has an output portion to output an amplified optical data signal, wherein the second pump light emitting device emits a pump wavelength of about 1410 nm to 1420 nm that is introduced into the fiber in proximately to the output portion, such that the second amplification pump wavelength counter propagates with respect to the propagation direction of the multiplexed optical data signal.

20. The amplifier of claim 14, wherein the third pump light emitting device emits an amplification pump wavelength which is split by the power splitter into a first split signal that counter propagates with respect to the propagation direction of a multiplexed optical data signal and a second split signal that co-propagates with the multiplexed optical data signal.

21. The amplifier of claim 1, wherein the wavelength separation between the first pump wavelength and a shortest wavelength of an optical data signal propagating along the fiber is greater than 55 nm.

22. The amplifier of claim 21, wherein the wavelength separation between the first pump wavelength and the shortest wavelength signal is greater than 70 nm.

23. The amplifier of claim 1, wherein the fiber comprises a first coil and a second coil, wherein the first pump light emitting device is optically coupled to said first coil of said fiber, and the second pump light emitting device is optically coupled to said second coil of said fiber.

24. An optical amplifier comprising:

a thulium-doped optical fiber comprising a first coil and a second coil;

a first pump light emitting device optically coupled to said first coil for generating a first amplification pump wavelength; and a second pump light emitting device optically coupled to said second coil for generating a second amplification pump wavelength, wherein each of said first and second amplification pump wavelengths comprise at least one pre-selected wavelength to pump an excited state of the fiber, wherein said first amplification pump wavelength is a wavelength pre-selected to optimize the noise figure of said amplifier, wherein said second amplification pump wavelength is a wavelength pre-selected to optimize the optical efficiency of said amplifier, and wherein said first amplification pump wavelength has a shorter wavelength than said second amplification pump wavelength.

25. The amplifier of claim 24, wherein the first amplification pump wavelength corresponds to an excited state absorption cross section value that is at least two times greater than an emission cross-section value at the first pump wavelength.

26. The amplifier of claim 24, wherein the first amplification pump wavelength is about 1000 nm to about 1099 nm.

27. The amplifier of claim 24, wherein the second amplification pump wavelength corresponds to a peak of an excited state absorption for the $^3F_4$ to $^3H_4$ transition of the fiber.

28. The amplifier of claim 24, wherein the optical fiber is an Sb silicate fiber.

29. A method of amplifying an optical signal comprising the steps of:

providing a thulium-doped optical fiber for transmitting an optical data signal;

generating a first amplification pump wavelength corresponding to a first emission cross section of the $^3H_4$ to $^3F_4$ transition of the fiber;

generating a second amplification pump wavelength corresponding to a second emission cross section of the $^3H_4$ to $^3F_4$ transition; and introducing said first amplification pump wavelength and said second amplification pump wavelength into said fiber, wherein the first pump wavelength corresponds to a lower emission cross section and lower excited state absorption cross section of the fiber than the second pump wavelength.

30. The method of claim 29, further comprising the step of:

introducing a third amplification pump wavelength to increase the $^3F_4$ level population of the fiber.

31. The method of claim 29, further comprising the step of:

introducing a third amplification pump wavelength which does not substantially deplete the ground state of the fiber.

32. The method of claim 29, wherein the first amplification pump wavelength is about 1370 nm to about 1380 nm.

33. The method of claim 29, wherein the first amplification pump wavelength is about 1000 nm to about 1099 nm.

34. The method of claim 29, wherein the second amplification pump wavelength is about 1400 nm to about 1420 nm.

35. The method of claim 29, wherein the step of generating a first amplification pump wavelength comprises emitting a first amplification pump wavelength of about 1370 nm to about 1380 nm and introducing said first amplification pump wavelength in proximately to an input portion of the fiber that receives a multiplexed optical data signal, and wherein the first amplification pump wavelength co-propagates with the multiplexed optical data signal.

36. The method of claim 29, wherein the step of generating a second amplification pump wavelength comprises emitting a second amplification pump wavelength of about 1400 nm to about 1420 nm and introducing said second pump wavelength in proximately to an output portion of the fiber that outputs a multiplexed optical data signal, and wherein the second amplification pump wavelength counter propagates with the multiplexed optical data signal.

37. The method of claim 30, wherein the step of introducing a third amplification pump wavelength comprises introducing an amplification pump wavelength of about 1550 nm to about 1620 nm and splitting the third amplification pump wavelength into a first split signal that counter propagates with respect to the propagation direction of an input optical data signal and a second split signal that co-propagates with the optical data signal.

38. The method according to claim 37, wherein said pump wavelength is about 1560 nm to about 1600 nm.

* * * * *